Dec. 17, 1929. J. J. KANE 1,740,356
ELECTRICAL POWER SYSTEM
Original Filed April 19, 1921

Inventor
J. J. Kane
by
Attorney

Patented Dec. 17, 1929

1,740,356

UNITED STATES PATENT OFFICE

JOHN J. KANE, OF MILWAUKEE, WISCONSIN, ASSIGNOR TO ALLIS-CHALMERS MANUFACTURING COMPANY, OF MILWAUKEE, WISCONSIN, A CORPORATION OF WISCONSIN

ELECTRICAL POWER SYSTEM

Original application filed April 19, 1921, Serial No. 462,520. Divided and this application filed June 2, 1928. Serial No. 282,414.

This invention relates in general to electrical power and distribution systems, and it has more particular relation to controlling devices or apparatus which are of particular utility for regulating generators acting to supply variable loads and driven by prime-movers, such as engines or turbines, or the like, especially where there is a tendency for the generator-driving means to operate at a speed dependent upon the load.

In certain installations where the generator is liable to be subjected to variable load, as where a steam turbine drives a generator, usually through a direct connection therewith, for supplying the variable electrical load, such as lights on a railway train or the locomotive thereof, means are necessary for regulating or limiting the speed of the turbine on the loss of a portion of the normal load on the generator. It will be obvious, that, if the generator were permitted to operate at a greatly increased speed on the removal of a portion of its normal load, the voltage on the lamps, or other translating devices constituting the load on the generator, might rise to a dangerously high value; and this is especially the case where the load comprises lamps of the incandescent type, where a comparatively small increase in voltage above that value for which the lamps are designed, may be highly injurious to the life of the lamps. Again, unless some means is provided for effectively limiting the speed of the generator and the turbine driving the same to a safe operating value on the removal of generator load, there is liable to be unnecessary wear and strain upon the generator and turbine, and even considerable danger to these elements of the system.

In accordance with a method of utilizing the features of this invention in connection with a system of the above described character, improved means are provided for regulating the speed of the prime-mover and the speed and output of the generator, an object of the regulating means provided being to maintain a characteristic, such as the voltage, of the energy supplied by the generator substantially constant independently of any tendency of the prime-mover to operate at a variable speed dependent upon the load on the generator. For attaining this regulating purpose, an artificial load may be provided which takes the place of the electrical load removed from the generator circuit, the regulation being effected in response to variations in the electrical load on the generator. This method of regulating the set involves considerable economy as to power used for braking purposes, especially when there is normal or full load on the generator, there being no appreciable loss due to any drag exerted by the brake at this time; and it also has the desirable feature that the power rating of the generator and the prime-mover need not be appreciably greater than is necessary to supply the normal or full electrical load on the generator.

It is an object of this invention to provide for an electrical power system, improved controlling apparatus utilizing magnetic effects resulting from different temperature coeficients of portions of the controlling apparatus.

It is a further object of this invention to provide in a system comprising a generator supplying a load of a variable character, improved means of the above described character for controlling the voltage of the generator as desired and independently of the load thereon.

It is a further object of this invention to provide a system of distribution comprising a generator supplying a load of a variable character and driven by fluid-operated means which automatically tends to increase its speed on loss of load, and improved means of the above described character for maintaining the voltage of the generator substantially constant independently of the load on the generator, while at the same time confining the speed of the generator and its driving means to a desired limiting value.

It is a further object of this invention to provide for a system of the character described, improved regulating apparatus of the above described character comprising an electrically operative brake and means for effectively energizing the brake to a degree responsive to the load on the generator and its driving means, for the general purpose of maintaining a substantially constant load upon the turbine, or like, independently of the value of the electrical load on the generator.

These and other objects and advantages are attained by this invention, various novel features of which will appear from the description and drawings, disclosing several embodiments of the invention, and will be particularly pointed out in the claims.

Figure 1:
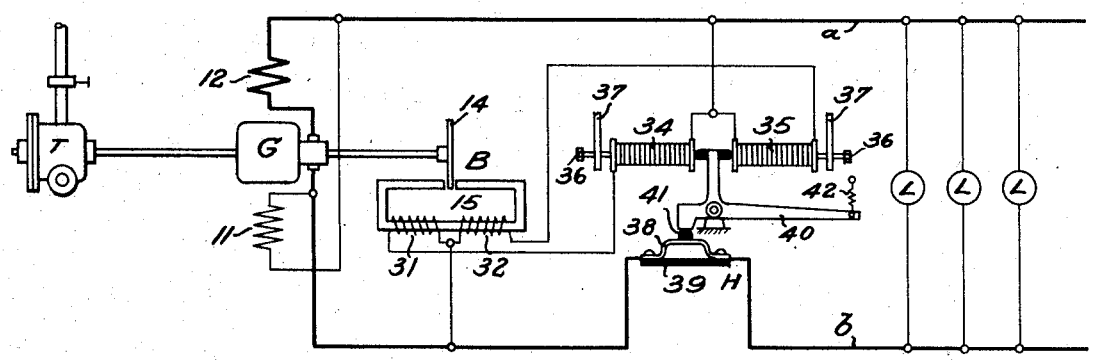
Fig. 1 is a diagrammatic showing of a system involving features of this invention.

In the embodiment of the invention disclosed in Fig. 1, a generator G is driven by a prime-mover, such as a steam turbine T which is preferably mounted on the generator shaft. The turbine T is of a character such that, with a definite throttle setting and inlet pressure, the speed of the turbine tends to vary inversely as the load thereon. The shunt field of the generator is indicated at 11 and the series field at 12, the machine terminals being connected to the distribution circuit $a$, $b$, which supplies a number of elements of a variable load L which may be considered as a lamp load. The turbine T is provided with an inlet of adjustable size, although, in the ordinary operation of the system, the inlet opening usually remains constant when once adjusted, this adjustment depending upon the normal generator speed desired under conditions of full load on the generator, and the working pressure of the steam at the turbine inlet. This pressure may be considered as being maintained substantially constant, as by means of a reducing valve or otherwise. A brake B is provided, the same being designed to act as an artificial load on the shaft of the generator and turbine, this brake comprising a disk 14 of conductive material mounted on the shaft and rotatable between poles of an electromagnetic field element 15 which is energized by a winding to be more particularly referred to hereinafter. As will be apparent, with the type of brake shown, the currents induced in the disk 14 and the consequent braking effect exerted by the disk on the shaft of the turbine and generator are proportionate to the effective flux present in the field element 15 of the brake and cutting the disk which operates in the air-gap of the field element of the brake.

Under conditions of normal load on the generator, that is, the full quota of lamps L which the particular system is designed to carry, it is intended that there shall be a minimum or no substantial braking effect exercised by the brake B on the turbine shaft, substantially all of the energy of the turbine being considered useful energy spent in maintaining the electrical load on the generator, the latter, especially through its field windings, being so designed as to produce the required electrical energy at the desired normal voltage under this full load condition. When a portion of the electrical load, in the form of one or more lamps, is removed from the generator circuit, there is a tendency of the turbine speed, and, hence, the voltage at the generator terminals, to increase.

The energizing winding of the field element 15 of the brake B is in the form of two shunt coils 31 and 32 differentially connected so as to produce opposite energizing effects on the field element of the brake. In series with the winding 31 is a carbon-pile resistance 34, and a carbon-pile resistance 35 is in series with the winding 32. The outer terminal abutment of each of the carbon-pile resistances 34, 35 is preferably adjustable, as by means of a screw 36 threaded through a relatively fixed support 37, the arrangement being effective to cause shifting of the terminal abutment as the screw 36 is adjusted. An electrically operated thermostat H, of any suitable form, is provided as a device for varying the resistance of the carbon-piles 34, 35. The thermostat shown here includes an expansible conducting member 38 in series with one side of the line circuit and having its ends fixedly supported or mounted upon one or more insulating supports 39. The central portion of the element 38 is bowed, as indicated, expansion of the element, due to increased heating effect produced by an increase in the current passing through the element, being effective to remove pressure normally exerted upon the short arm of the lever 40, through the operating element 41 secured to the upper side of the central part of the bowed portion of the element 38, the lever being biased by a spring 42 against operation by the bowed expansible element 38. An intermediate arm of the lever 40 has operating portions in engagement with opposing terminal abutments of the carbon-piles 34, 35. The operating portion 41 attached to the bowed expansible element 38 of the thermostat H is effective to shift the lever 40, to a degree dependent upon the current in the generator circuit, against the tension of the spring 42.

The parts of this system are in the positions which they occupy under conditions of normal or full load on the generator G. Under these conditions, the lever 40 is actuated, against the tension of the spring 42 to a position wherein it bears against the terminals of the carbon-pile resistances 34, 35 with sufficient pressure to cause energizing effects of the differential windings 31, 32 to just neutralize each other. It will be apparent that an exact balance of magnetizing effects of these windings can be readily secured by proper adjustment of the adjusting screws 36. As will be apparent, the brake B exerts no load upon the turbine shaft at this time.

As elements of electrical load are removed from the generator circuit, the distortion of the conducting element 38 of the thermostat decreases and the lever 40 is shifted by its spring 42 so as to cause greater compression of the carbon-pile 34 and less compression of the carbon-pile 35, with the result that the current in the circuit of the winding 31 increases and the current in the winding 32 decreases, the general effect being to cause resultant effective energization of the brake B to a degree proportional to the amount of electrical load removed from the circuit of the generator. The parts are so designed that when there is a minimum or no load upon the generator G, the current in the circuit 31 is a maximum and the current in the circuit in the winding 32 is a minimum, and hence, the brake is energized to a maximum extent. By proper design of the parts of the brake and the control means therefor, the drag or load due to the brake B can be made just equal to the electrical load removed from the generator circuit.

A distinctive feature of this system is that, in case the load upon the generator should, for some unforeseen reason, such as a short-circuit, be increased considerably above normal, the lever 40 would be shifted by the increased distortion of the conducting element 38 of the thermostat so as to cause compression of the carbon-pile 35 and release of the carbon-pile 34, with consequent increase in the current in the winding 32 and decrease in the current in the winding 31, the general effect being substantial energization of the brake to act as an additional mechanical load to cut down the speed of the turbine and the electrical energy of the generator.

Figure 2:
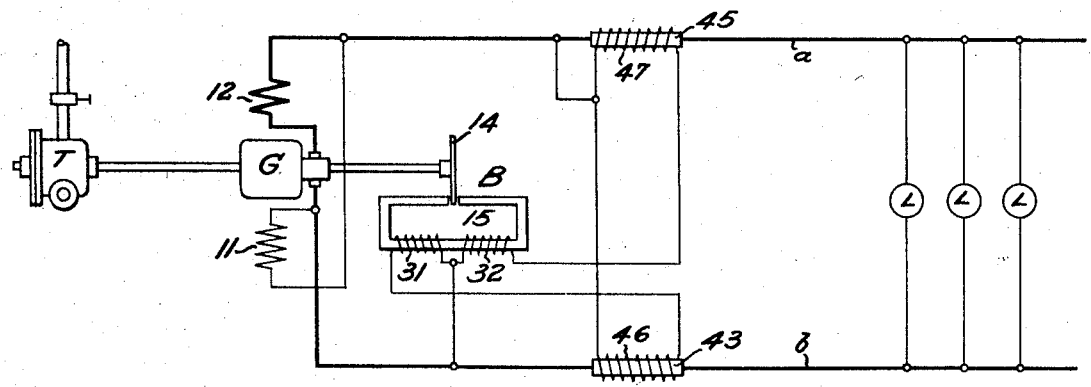
Figs. 2 and 3 are diagrammatic views showing modifications of the system of Fig. 1.

In the modification shown in Fig. 2, the brake is provided with differentially arranged, shunt energizing windings 31, 32. The generator circuit is provided with heating elements 43 and 45 connected in series therewith. These heating elements become heated or produce heat to a degree directly proportional to the current passing therethrough. A resistance element 46 is directly associated with the heating element 43 and is connected in series with the winding 31; and a resistance element 47 is directly associated with the heating element 45 and is connected in series with the circuit of the winding 32. The resistances 46 and 47 are so associated with the heating elements, preferably being wound thereon, as to become heated to a degree dependent upon the currents passing through the heating elements. The resistance 46 is of such a composition that its resistance decreases as the temperature of the element increases; and the resistance element 47 is of such a nature that its resistance increases as the temperature of the element increases. In other words, the resistance 46 has a negative temperature coefficient, and the resistance 47 has a positive temperature coefficient.

The heating elements 43 and 45 and the resistance elements 46 and 47, and also the windings 31, 32 are so designed that when the heating elements 43 and 45 are subjected to the heating consequent to the presence of normal or full load current in the generator circuit, the energizing effects of the windings 31, 32 are just equal and opposite, and there is no consequent resultant energization of the field element 15 of the brake B. As the electrical load on the generator decreases, the heating effects of the heating elements 43 and 45 decrease, and consequently the resistances of the resistance elements 46 and 47 increase and decrease, respectively. The general effect of this arrangement under the circumstances is that the current in the winding 31 increases and the current in the winding 32 decreases, causing a resultant effective energization of the field element 15 of the brake, causing the latter to exert a mechanical load or drag on the turbine shaft. By proper design of the parts of the system, the braking effect exerted by the brake B may be made equal to that portion of the electrical load removed from the generator circuit. In this way, the total load upon the turbine may be maintained substantially constant, and hence, there will be substantially constant voltage on the generator independently of variations in the load thereupon.

Figure 3:
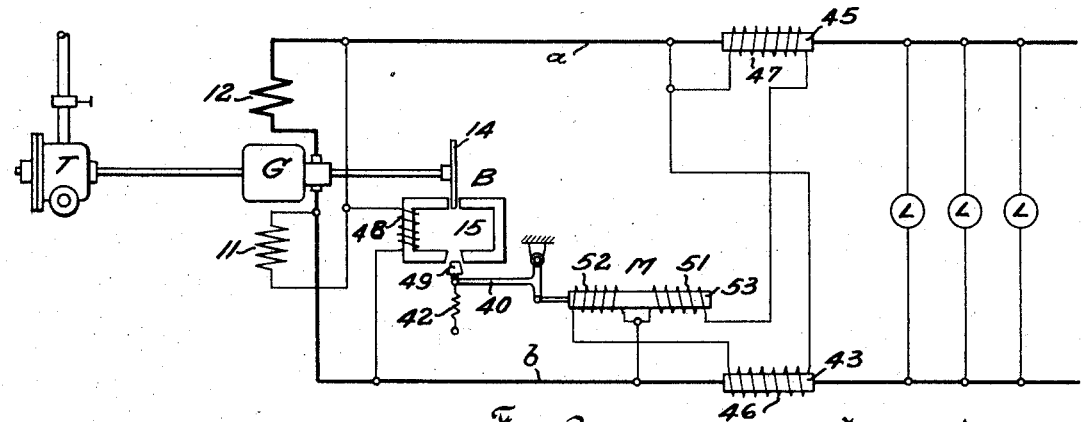

In the modification shown in Fig. 3, the field element 15 of the brake B is provided with a single shunt energizing winding 48 and a removable or adjustable bridge element 49 effective, when in full bridging position, to substantially close a gap in the magnetic circuit of the field element, but normally biased to a position wherein it has no substantial effect in magnetically bridging this gap. Hence, when the bridge member 49 is in withdrawn position, as indicated, the energizing winding 48 is ineffective to produce any substantial energizing effect upon the conductive element 14 of the brake. An electromagnet M is provided with a core 53 and differentially connected, shunt energizing windings 52 and 51 thereon which are connected in series with the resistance elements 46 and 47, respectively, the latter being arranged in heating relation to the heating elements 43 and 45, respectively, connected in series with the load circuit of the generator. Resistance element 46 has a negative temperature coefficient and resistance 47 has a positive temperature coefficient. The core 53 is mechanically connected to an arm of the lever 40 so that effective energization of the core due to a resultant effect in favor of the winding 52 serves to actuate the lever, against the bias of the spring 42, in such a manner as to cause the bridging element 49 to more or less effectively bridge the gap in the circuit of the field element 15 and thus produce effective energization of the brake B. The electromagnet M, the resistances 46 and 47, and the heating elements 43 and 45 are so designed that under conditions of normal or full load on the generator, the electromagnetic effects exerted by the windings 51 and 52 on the core 53 substantially neutralize each other and thus the spring 42 is effective to hold the bridge element 49 fully withdrawn from bridging position.

The parts are shown in the positions which they occupy under conditions of normal or full load on the generator. As the electrical load on the generator is decreased, the resistance of resistance element 47 decreases, and the resistance of resistance element 46 increases, the increased current in the shunt circuit including the winding 51 and decreased current in the shunt circuit including the winding 52 causing a substantial resultant energization of the core 53 of the magnet, this energization being dependent upon the amount of electrical load removed from the generator circuit. The magnet is thus effective to move the bridging element 49 to a position wherein it more or less fully bridges the gap in the field element 15 and permits effective energization of such field element and the conductive disk 14 of the brake so as to put a load upon the turbine shaft which is substantially equal to the electrical load removed from the generator circuit. By proper design of the parts, the load or braking effect exerted by the brake B is substantially equal to the difference between full or normal load and the actual load on the generator; and in this way, there is a substantially constant load on the turbine shaft at all times, thus eliminating any tendency towards variation in speed thereof and maintaining constant voltage on the generator independently of load variations thereon.

It will be apparent that, in all of the systems described, the brake B is substantially unenergized under conditions of normal or full load upon the generator, and, hence, there is no loss of power due to any mechanical drag exerted by the brake upon the turbine shaft; and any appreciable braking effect is present only when the electrical load on the generator is less than normal or full load value. Further, the various designs or systems are effective to cause the production of the desired braking effects for the purpose of maintaining constant voltage upon the generator independently of variations in load thereon.

The present application constitutes a division of applicant's copending application Ser. No. 462,520, filed April 19, 1921.

It should be understood that it is not desired that the invention claimed be limited to the exact details of construction and design of the systems and parts and features thereof shown and described herein, for various obvious modifications, and various other applications or uses of features of the controlling apparatus disclosed herein, will occur to persons skilled in the art; and it is desired that the invention be considered as covering such modifications and applications as are included under or defined by the claims.

It is claimed and desired to secure by Letters Patent:

1. In combination, a generator, means for driving said generator, and an electromagnetic brake associated with said generator and comprising a disk of conductive material, and means for producing an effective magnetic field for said disk that varies inversely as the load on said generator, said means comprising differentially arranged energizing windings on said brake, the circuits of the several windings having substantially different temperature coefficients.

2. In combination, an electric generator, a supply circuit connected thereto, a variable working load connected to said supply circuit, and a magnetic drag device for said generator including an energizing winding comprising differentially arranged shunt connected winding sections, and means responsive to temperature changes incident to variation in a characteristic of the energy in the circuit supplied by said generator for variably affecting the resultant energizing effect of said winding.

3. In combination, an engine, an electric generator adapted to be driven thereby, a supply circuit connected thereto, and means for maintaining the voltage of said generator substantially constant in spite of a tendency of said engine to operate at variable speed, said means comprising an electromagnetically actuated brake having a plurality of differentially arranged energizing windings connected in shunt to said generator, and thermally responsive means responsive to the load on said generator for controlling the energizing effect of one of said windings.

4. In combination, an engine, a generator driven thereby and operative to supply a power circuit of variable load requirements, and means for exercising a controlling effect on the speed of said engine, said means comprising a plurality of windings connected in shunt to said generator, and heat responsive devices for disproportionally varying the energizing effects of said windings in response to variations in a characteristic of the energy of said power circuit, and a device for utilizing variable differential effects of said windings.

5. In combination, a generator operative to supply a power circuit of variable load requirements, and means for preserving substantially constant a characteristic of the electrical energy supplied by said generator, said means comprising a magnetic circuit having a gap portion, and a movable element electromagnetically associated with said gap portion, and thermally responsive means for causing the effective energization of said magnetic circuit to vary inversely as the load on said generator, said latter means including a plurality of differentially arranged windings in shunt to said generator and operatively associated with said magnetic circuit.

6. In combination, a generator operative to supply a circuit subject to a variable load, and means for exercising a controlling effect on the voltage of said generator, said means comprising an electromagnetically-actuated device including a plurality of differentially arranged windings connected in shunt to said generator, and means thermally responsive to a characteristic of the output of said generator for varying the resistance of the circuit of at least one of said windings.

7. In combination, an electric generator adapted to supply a variable load, and means for controlling said generator to maintain substantially constant voltage thereon, said means comprising an electromagnetically-actuated brake including an energizing winding therefor, and thermally responsive instrumentalities for causing the effective energization of said brake to vary in response to a characteristic of the output of said generator.

8. In combination, an electrical power circuit, and means for controlling a characteristic of the electrical energy of said circuit, said means comprising electromagnetically-actuated controlling instrumentalities including a plurality of differentially connected energizing windings in shunt to said circuit, and thermally responsive means associated with said windings for insuring the production of a resultant energizing effect which varies with variations in a characteristic of the energy of said circuit.

9. In combination, an electrical generator having field windings and an armature, and means for controlling said generator to maintain substantially constant a characteristic of the energy of said generator, said means comprising a controlling circuit including a plurality of differentially variable resistance elements, and an electromagnetic device independent of the circuit of said field windings for utilizing variable differential effects of said resistances to cause variation in the controlling effect exercised on said generator.

10. An electrical power circuit, and means for controlling a characteristic of the energy of said power circuit, said means comprising an electromagnetic device including an energizing winding in the form of a plurality of differentially arranged sections, and means for controlling the effective energization of said field element through said winding, said means including devices differentially thermally responsive to a characteristic of the energy of said circuit.

11. In combination, an electrical power circuit, means for supplying energy thereto, and a controlling device for said circuit comprising a magnetizable core having an air-gap, and an armature element subjected to flux across the air-gap of said magnetic circuit, said controlling device including and being under the joint control of two windings having variable energizing effects, and means responsive to variations in temperature incidental to the current flow in said power circuit for causing variation in the energizing effects produced by said windings.

12. In combination, an electrical power circuit, means for supplying energy thereto, and a controlling device for said circuit comprising a magnetizable core having an air-gap, and an armature element subjected to flux across the air-gap of said magnetic circuit, said controlling device including and being under the joint control of two differentially arranged windings, and resistance sections associated with the circuits of said windings and variably responsive to variations in temperature incident to the current flowing in said power circuit for causing variation in the energizing effects produced by said windings.

13. In a regulator system, the combination with a dynamo-electric machine having armature and field elements, and a regulator associated therewith, said regulator comprising a magnetizable core independent of the field element of said machine and an energizing coil therefor, of means controlled by the energy of said dynamo-electric machine through devices thermally responsive to variations in a characteristic of said energy for varying the flux density of the core of said regulator.

14. In a regulator system, the combination with a dynamo-electric machine having an armature and a field-magnet including a winding, of regulating means therefor comprising a magnetizable core independent of the field magnet of said machine, an energizing winding therefor, and means having differential effects produced by variations in a characteristic of the energy of said dynamo-electric machine for varying the effective energization of the core of said regulator by said energizing winding.

15. In a regulator system, the combination with a dynamo-electric machine having an armature winding and a field-magnet winding, of regulating means therefor comprising a magnetizable core having an air-gap therein and an energizing coil therefor, an electromagnet having a movable armature and means controlled thereby for varying said air-gap, said electromagnet having an energizing winding and means thermally responsive to variations in a characteristic of the energy supplied by said machine for varying the energizing effect of said latter winding.

16. In a controlling device for an electrical circuit, a field element of magnetic material, an energizing winding for said field element, a rotatable armature of conductive material cooperative with a polar portion of said field element, and means for causing variation in the controlling effect exerted upon said armature, said means comprising an electromagnetic device having an energizing winding in a plurality of differentially connected sections and thermally responsive to the current in said electrical circuit.

17. In combination, an electrical power circuit, means for supplying energy thereto, and a controlling device comprising a magnetic circuit having an air-gap, and a conductive disk subjected to flux across the gap in said magnetic circuit, said controlling device including and being under the joint control of two differentially arranged windings, and means thermally responsive to variations in the load on said power circuit for controlling the energizing effect of one of said windings.

In testimony whereof, the signature of the inventor is affixed hereto.

JOHN J. KANE.